US011231026B2

(12) United States Patent
Watanabe et al.

(10) Patent No.: US 11,231,026 B2
(45) Date of Patent: Jan. 25, 2022

(54) VALVE DEVICE

(71) Applicant: FUJIKIN INCORPORATED, Osaka (JP)

(72) Inventors: Kazunari Watanabe, Osaka (JP); Kohei Shigyou, Osaka (JP); Kenji Aikawa, Osaka (JP); Tomohiro Nakata, Osaka (JP); Takahiro Matsuda, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/757,939

(22) PCT Filed: Oct. 22, 2018

(86) PCT No.: PCT/JP2018/039162
§ 371 (c)(1),
(2) Date: Apr. 21, 2020

(87) PCT Pub. No.: WO2019/087843
PCT Pub. Date: May 9, 2019

(65) Prior Publication Data
US 2020/0325887 A1 Oct. 15, 2020

(30) Foreign Application Priority Data
Oct. 31, 2017 (JP) .............................. JP2017-210391

(51) Int. Cl.
*F16K 31/365* (2006.01)
*F04B 43/02* (2006.01)
(Continued)

(52) U.S. Cl.
CPC ................. *F04B 43/02* (2013.01); *F16K 7/12* (2013.01); *F16K 7/17* (2013.01); *F16K 11/20* (2013.01);
(Continued)

(58) Field of Classification Search
CPC . F16K 7/16; F16K 7/14; F16K 7/7126; F16K 7/17; F16K 11/20; F16K 11/22;
(Continued)

(56) References Cited

U.S. PATENT DOCUMENTS 4,558,845 A * 12/1985 Hunkapiller ......... B01J 19/0046
137/606
5,305,788 A * 4/1994 Mayeux ................. G01N 1/16
137/583
(Continued)

FOREIGN PATENT DOCUMENTS

| JP | 3-168494 A | 7/1991 |
| JP | 6-258200 A | 9/1994 |

(Continued)

OTHER PUBLICATIONS

International Search Report issued in International Bureau of WIPO Patent Application No. PCT/JP2018/039162, dated Jan. 15, 2019.
(Continued)

*Primary Examiner* — Umashankar Venkatesan
(74) *Attorney, Agent, or Firm* — Greenblum & Bernstein, P.L.C.

(57) ABSTRACT

A valve device includes valve elements each having a valve seat, a valve seat support, and a diaphragm provided so as to be able to abut on and separate from the seat surface of the valve seat, the diaphragm making the flow passage of the valve seat and the corresponding secondary flow path communicate through the gap between the diaphragm and the valve seat, and the valve seat support has seal surfaces that
(Continued)

cooperate with a part of the inner wall surface of the corresponding accommodation recess to shut off the communication between the corresponding primary flow path and the secondary flow path, and a detour passage that connects the primary flow path and the flow passage of the valve seat, and the valve body defines a communication passage that makes the secondary flow paths communicates with each other.

12 Claims, 11 Drawing Sheets

(51) Int. Cl.
    *F16K 7/17*       (2006.01)
    *F16K 27/00*     (2006.01)
    *F16K 11/22*     (2006.01)
    *F16K 11/20*     (2006.01)
    *F16K 7/12*       (2006.01)

(52) U.S. Cl.
    CPC ............ *F16K 11/22* (2013.01); *F16K 27/003* (2013.01); *F16K 31/365* (2013.01)

(58) Field of Classification Search
    CPC ...... F16K 27/003; F16K 31/365; F04B 77/14; F04B 37/14
    USPC .......................................... 137/625.17, 625.4
    See application file for complete search history.

(56) References Cited

U.S. PATENT DOCUMENTS

| | | | |
|---|---|---|---|
| 5,524,865 A * | 6/1996 | Uchisawa | F16K 7/14 |
| | | | 251/331 |
| 5,558,129 A | 9/1996 | Mayeux | |
| 5,653,259 A * | 8/1997 | Ramstad | B01J 4/02 |
| | | | 137/240 |
| 6,209,571 B1 | 4/2001 | Itoh et al. | |
| 6,871,803 B1 * | 3/2005 | Ohmi | H04W 74/006 |
| | | | 239/596 |
| 2003/0042459 A1 * | 3/2003 | Gregoire | F16K 27/0236 |
| | | | 251/331 |
| 2003/0155024 A1 | 8/2003 | Hanada et al. | |
| 2016/0047483 A1 | 2/2016 | Hirose et al. | |
| 2016/0178072 A1 | 6/2016 | Kitano et al. | |

FOREIGN PATENT DOCUMENTS

| | | |
|---|---|---|
| JP | 10-47514 A | 2/1998 |
| JP | 10-311451 A | 11/1998 |
| JP | 2000-213667 | 8/2000 |
| JP | 2003-21248 A | 1/2003 |
| JP | 2007-3013 A | 1/2007 |
| JP | 2008-106811 A | 5/2008 |
| JP | 2014-190387 A | 10/2014 |
| JP | 2015-36563 A | 2/2015 |

OTHER PUBLICATIONS

China Office Action issued in CN Application No. 201880071291X, dated Jul. 1, 2021 and English language translation.

* cited by examiner

[fig.1A]
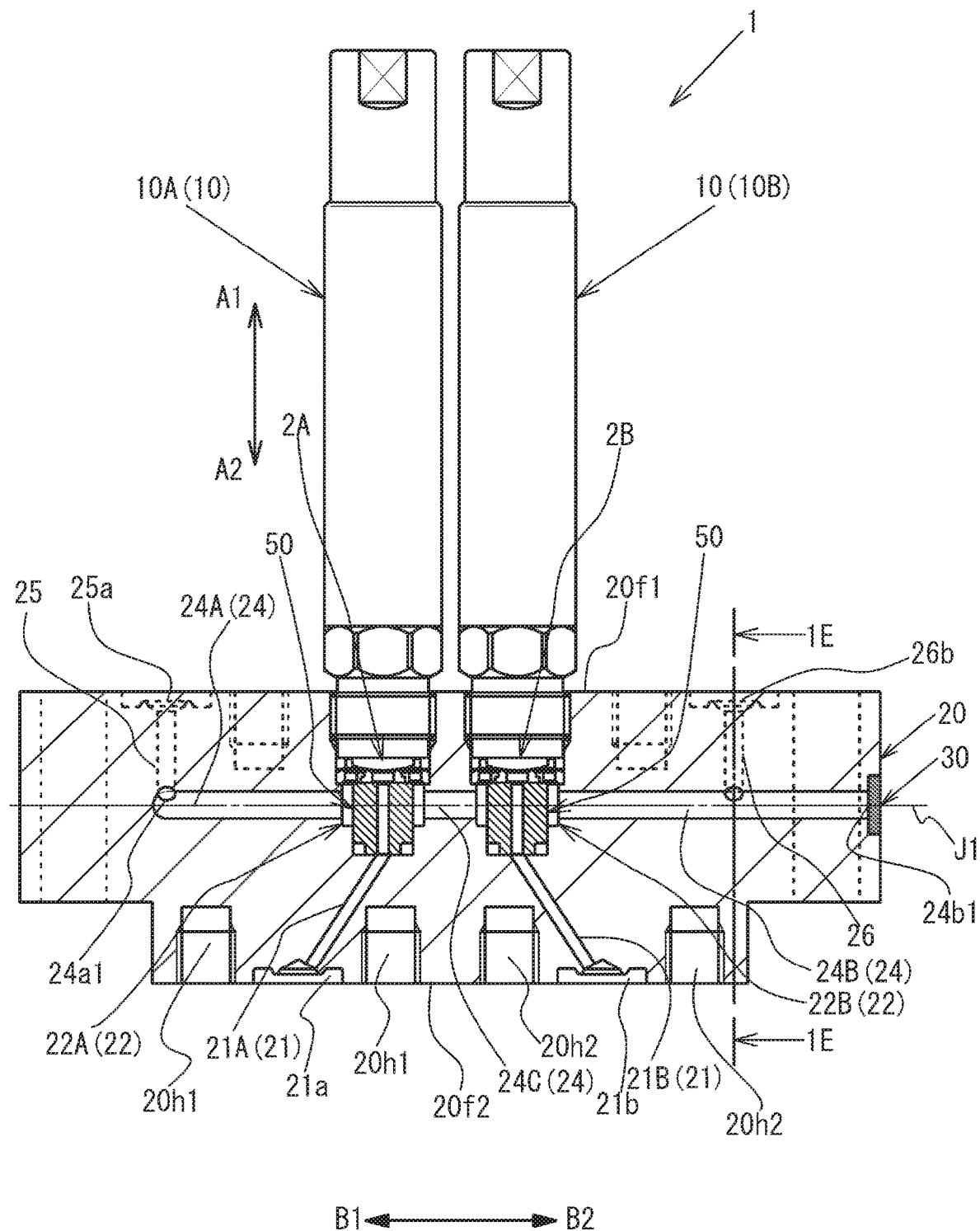

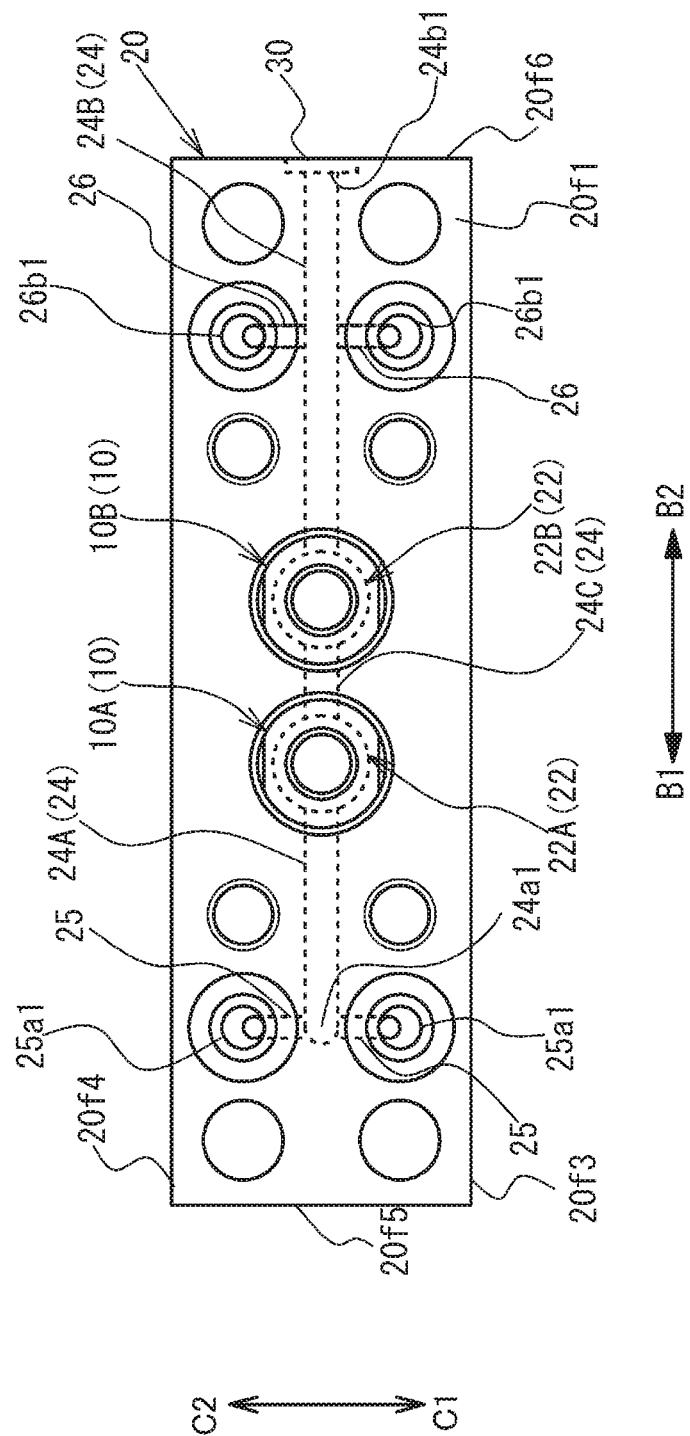

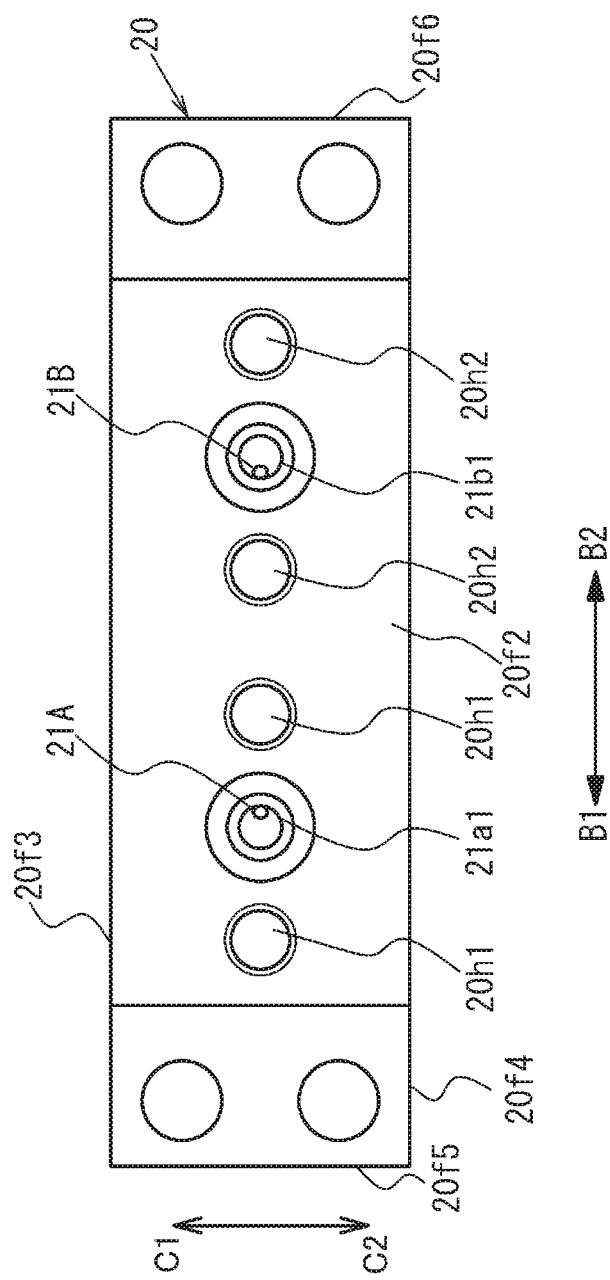

[fig.1D]
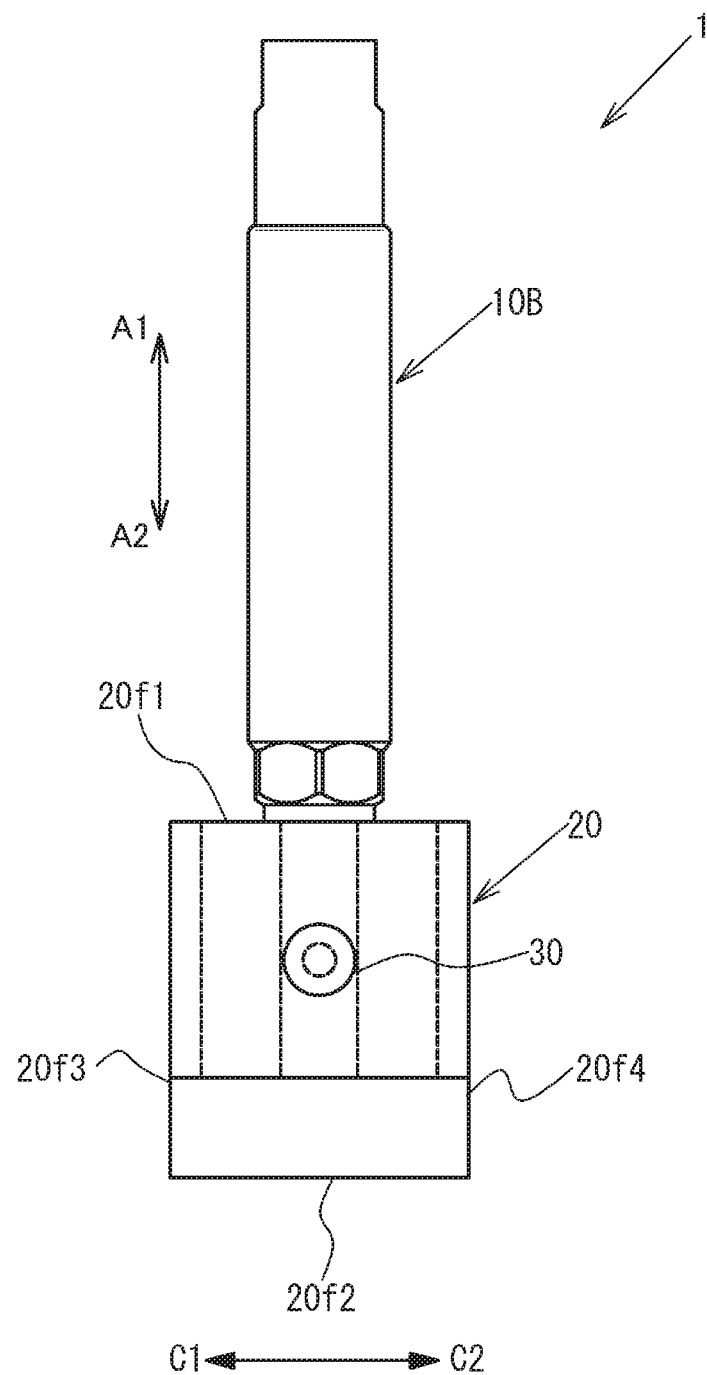

[fig.1E]
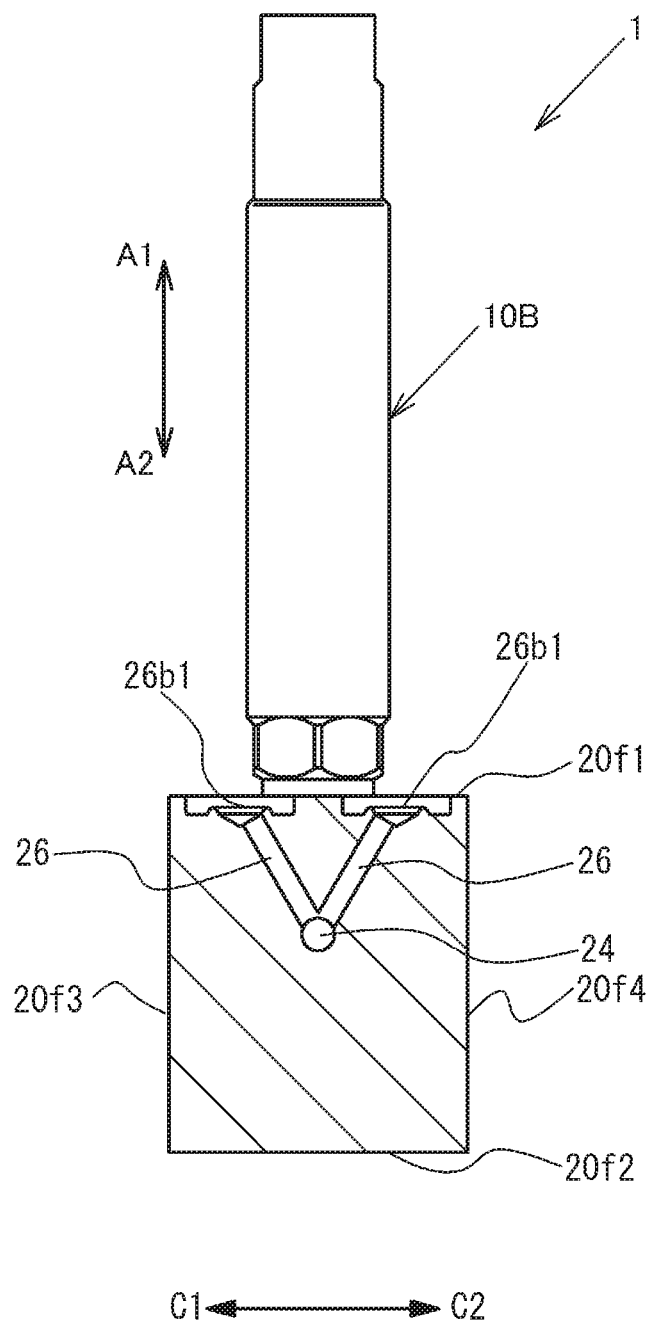

[fig.2]
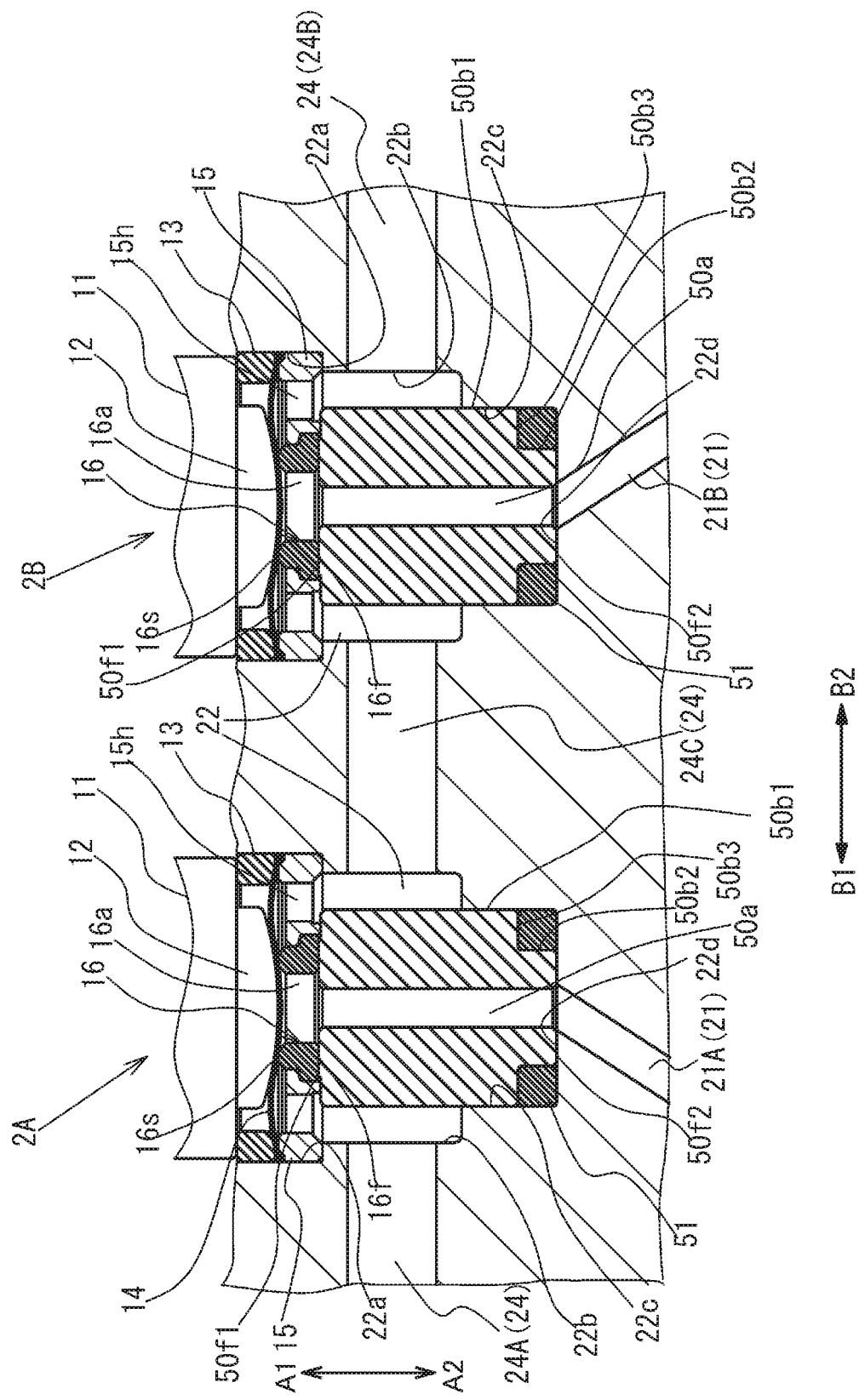

[fig.3A]
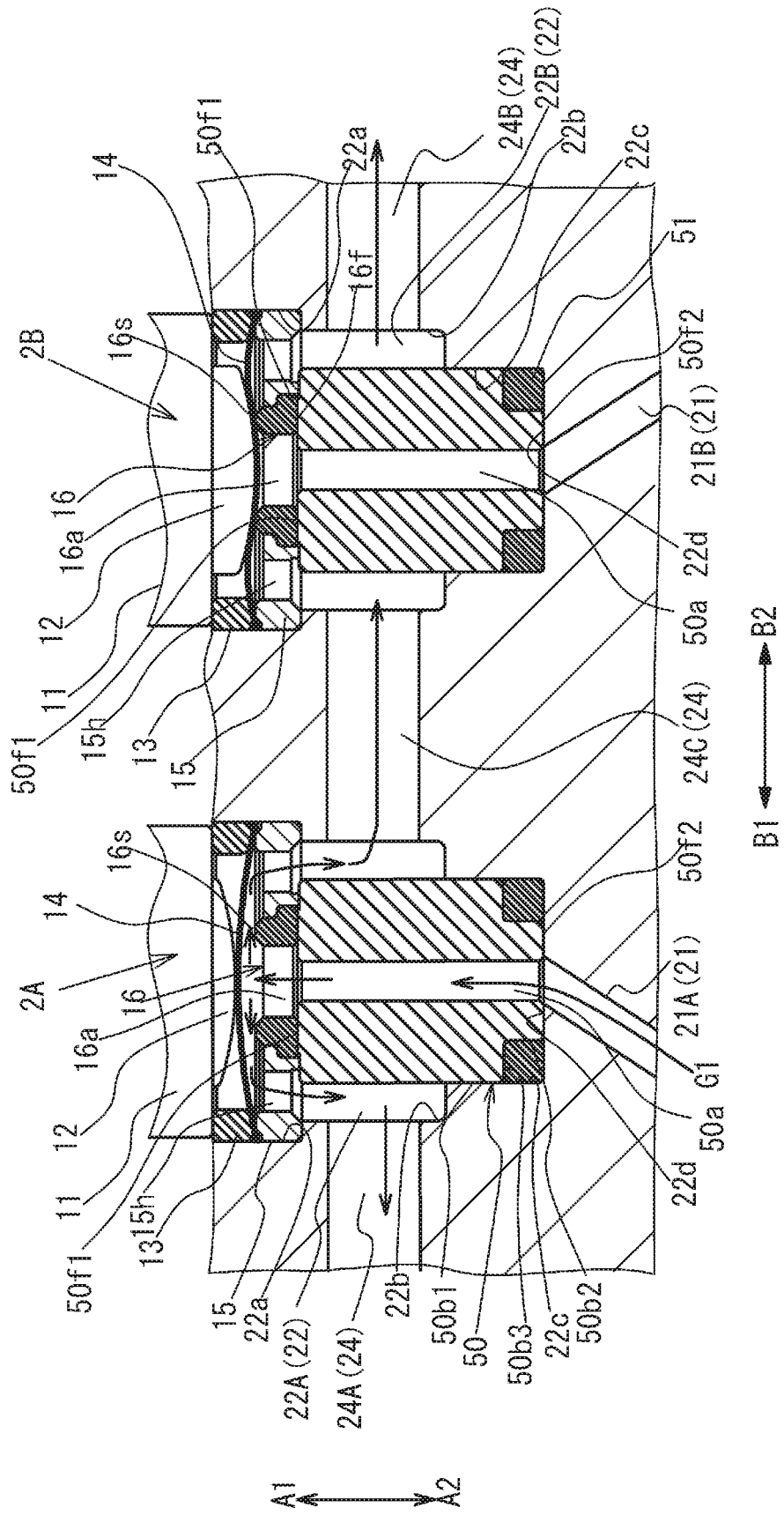

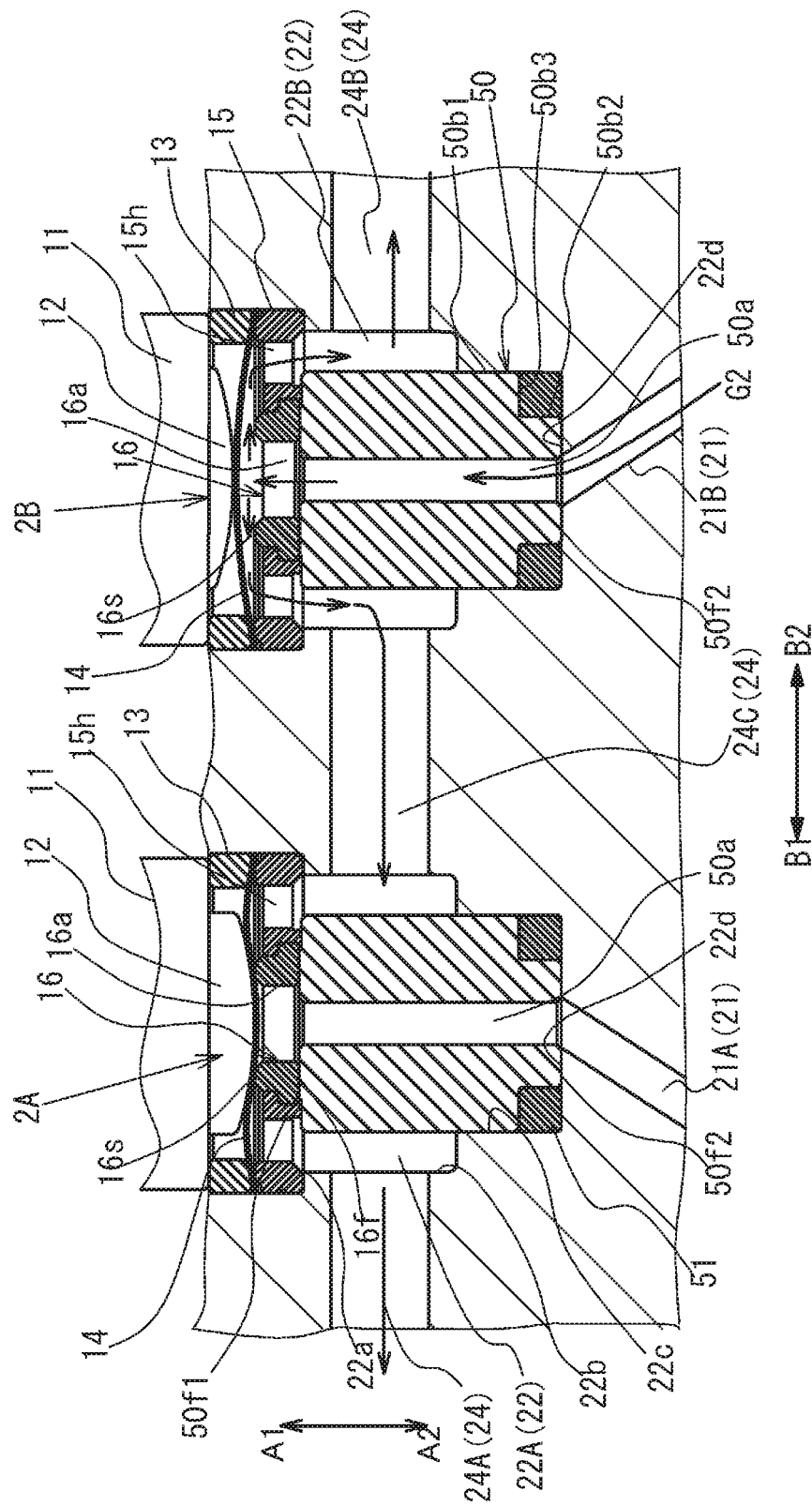
[fig.3B]

[fig.4]
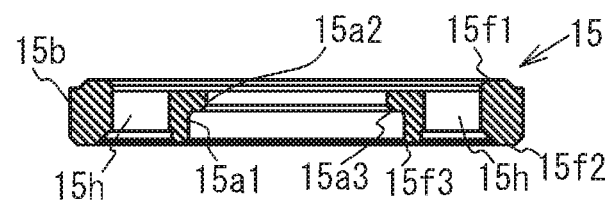
[fig.5]
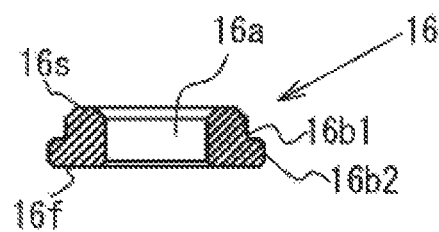
[fig.6]
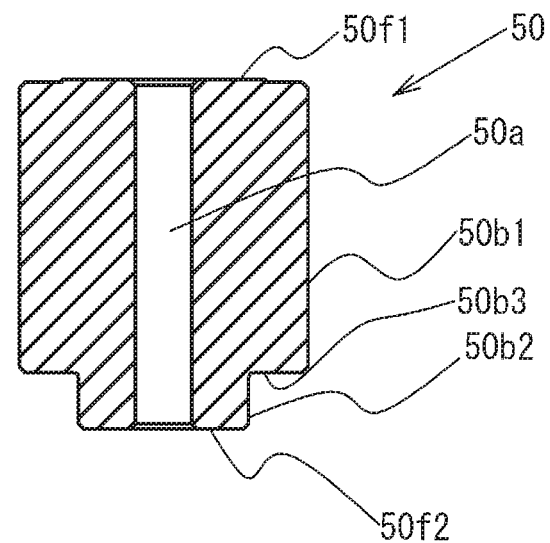

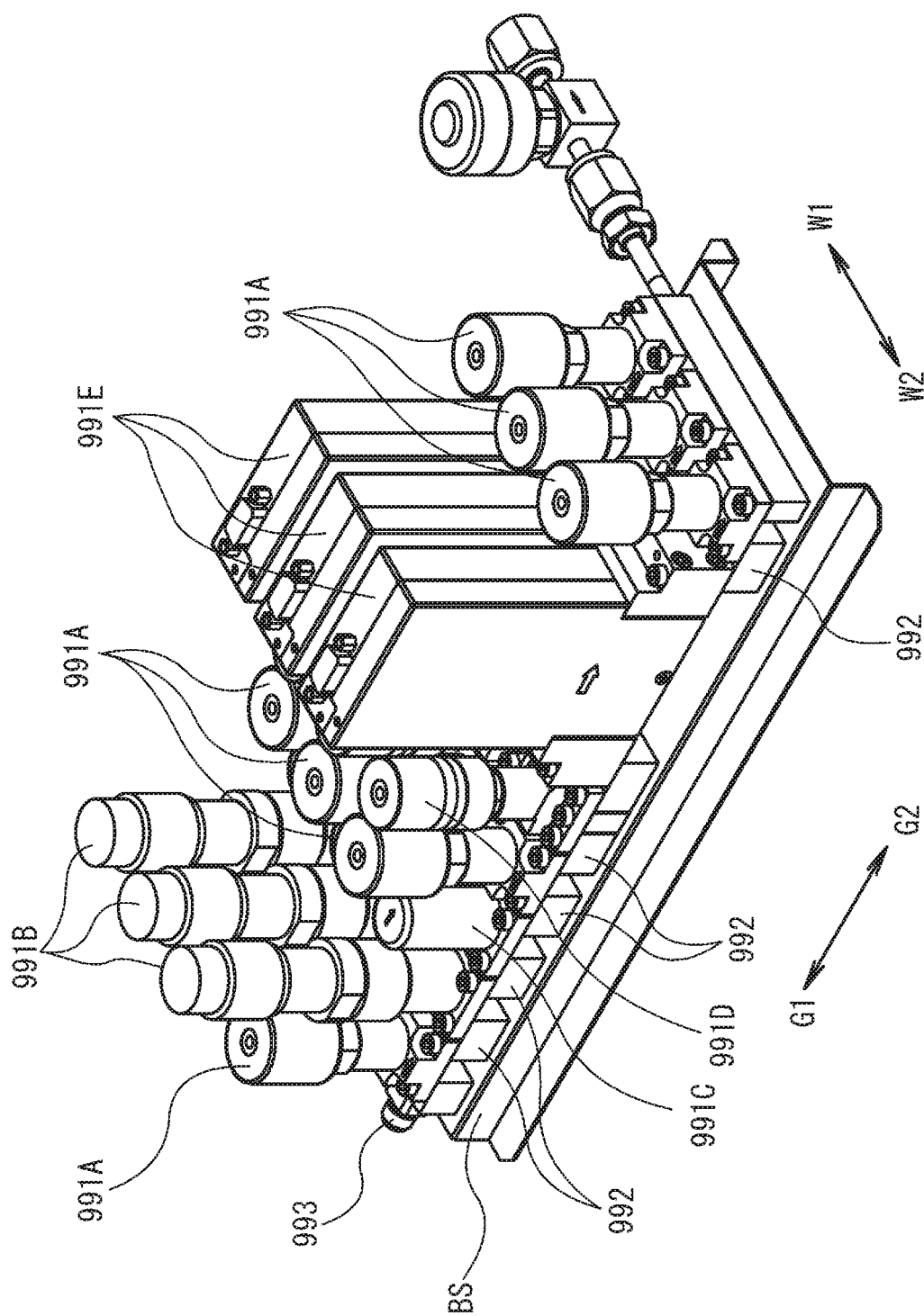
[fig.7]

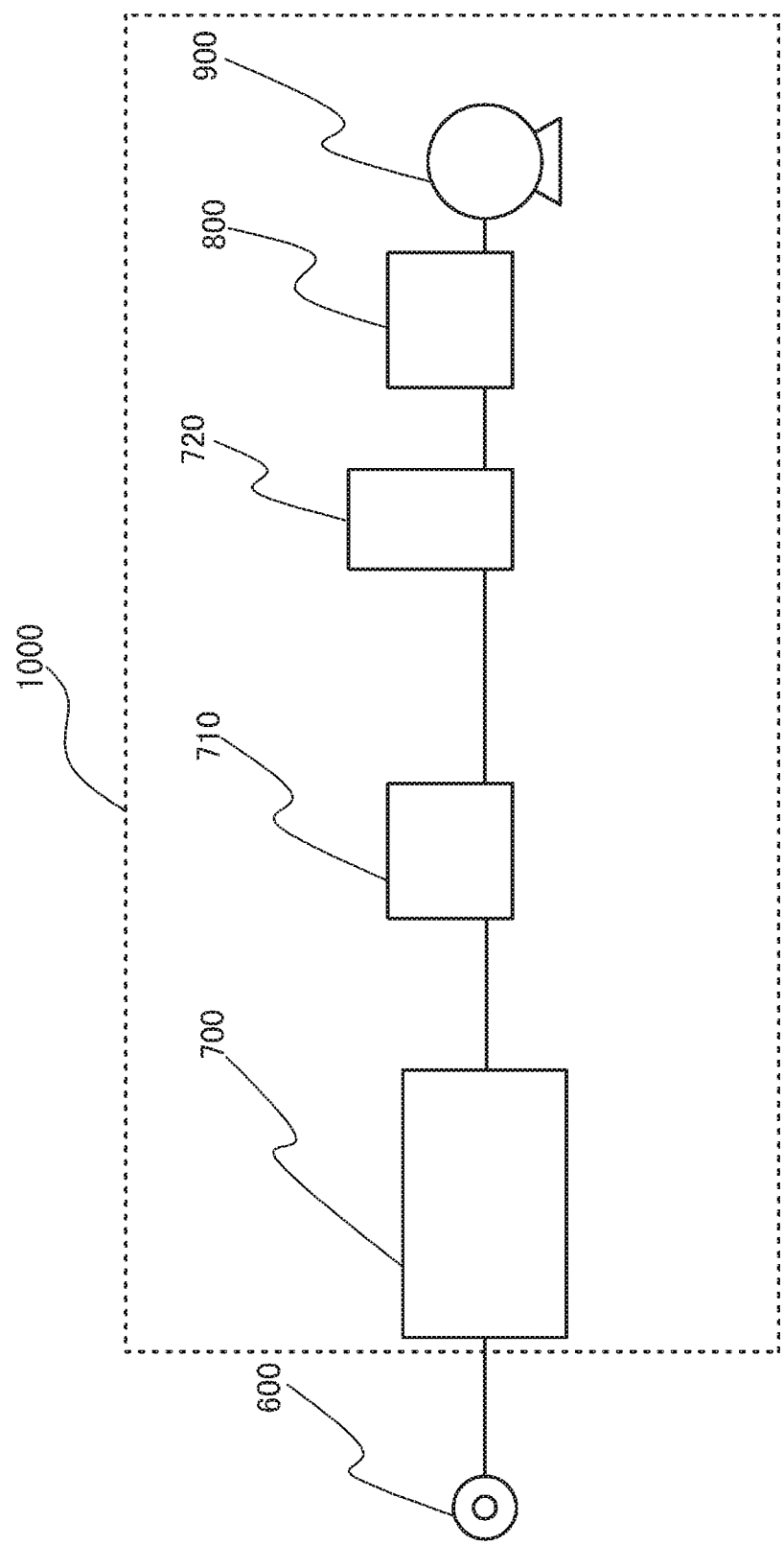

VALVE DEVICE

TECHNICAL FIELD

The present invention relates to a valve device, a flow rate control device using the valve device, a flow rate control method, a fluid control device, a semiconductor manufacturing method, and a semiconductor manufacturing method.

BACKGROUND ART

In various manufacturing processes such as semiconductor manufacturing processes, a fluid control device in which various fluid devices such as an open-close valve, a regulator, a mass flow controller, and the like are integrated is used in order to supply accurately measured process gases to a processing chamber.

In such a fluid control device as described above, integration is realized by arranging an installation block (hereinafter referred to as a base block) in which a flow path is formed along the longitudinal direction of the base plate instead of a pipe joint, and installing a plurality of fluid devices including a joint block to which pipe joints and various fluid devices are connected, and the like on the base block (for example, refer to Patent Document 1).

In some, fluid control devices, flow-controlled process gas is added by a predetermined amount to each of a plurality of carrier gas lines. It is an object of the present invention to perform a uniform process on the entire surface of a wafer by providing a plurality of gas ejection ports in a process chamber and feeding the process gas on a carrier gas having a controlled flow rate ratio. In this case, the number of lines of a set of various fluid devices arranged in the longitudinal direction is required by multiplying the number of types of process gases by the number of carrier gas lines, which hinders miniaturization and integration.

PATENT LITERATURE

PTL 1: Japanese Laid-Open Patent Application No. 2007-3013

SUMMARY OF INVENTION

Technical Problem

Controlling the supply of process gases in various manufacturing processes requires higher responsiveness and requires that the fluid control device be as compact and integrated as possible and installed closer to the processing chamber to which the fluid is supplied.

Along with the increase in size of processing objects, such as the increase in size of the diameter of the semiconductor wafer, it becomes necessary to also increase the supply flow rate of the fluid supplied from the fluid control device into the processing chamber.

In a valve device used in a fluid control device, a fluid flow path is directly formed in a block-shaped valve body.

With the miniaturization of the fluid control device, it is naturally necessary to miniaturize the valve body. However, when the valve body is miniaturized, it is not easy to optimally arrange the flow path while securing the flow rate of the flow path.

Further, when it is necessary to branch a flow of fluid that has been flown into the flow path on the primary side of the valve device and passed through the valve into a large number of flows of process gases on the secondary side, it is necessary to form flow paths corresponding to the number of diverted flows in the valve body, and it is necessary to increase the size of the valve body. In addition, it is generally necessary to flow a purge gas such as nitrogen gas into the branch flow path through which the process gas flows. When the flow path for supplying the purge gas through the valve is formed in the valve body, it is necessary to further increase the size of the valve body.

In the conventional fluid control device, a coupling for dividing the process gas and a coupling for dividing the purge gas exist separately, and a valve for selecting which gas is to be flowed is provided for each line of the fluid control device. Therefore, a number of valves proportional to the number of lines are required for switching between the process gas and the purge gas. Further, in this conventional structure, efforts have been made to reduce the stagnation portion where the original gas remains and stagnates due to poor gas substitution when the gas is flowed through the line. However, it is difficult to eliminate a stagnation portion formed in a region of the flow path in which the gas does not flow.

It is an object of the present invention to provide a miniaturized valve device capable of dramatically increasing the degree of freedom in arranging the flow paths of the valve body while securing a necessary flow rate.

Another object of the present invention is to provide a valve device capable of branching a plurality of fluids, that has been flowing into a flow path on a primary side, into a large number of flows on a secondary side while maintaining miniaturization of the device. It is also an object of the present invention to provide a fluid control device which is miniaturized by reducing the total number of valves.

Another object of the present invention is to provide a valve device in which gas retention is minimized and gas substitution is improved.

Solution to Problem

The valve device according to the present invention is a valve device comprising a block-shaped valve body, the valve body defining first and second accommodation recesses in which first and second valve elements are respectively housed, primary flow paths respectively making the first and second accommodation recesses communicate with the exterior of the valve body, secondary flow paths respectively making the first and second accommodation recesses communicate with the exterior of the valve body, and a communication flow path connecting the first and second accommodation recesses to make the secondary flow paths communicate with each other, and each of the first and second valve elements selectively switching a state of communication between the primary and secondary flow paths connected to the first or second accommodation recess.

Preferably, the valve body defines opposing top and bottom surfaces and side surfaces extending between the top and bottom surfaces, each of said first and second valve elements comprises:

a valve seat having an annular seating surface formed on one end surface, an annular sealing surface formed on the other end surface, and a flow passage formed inside the seating surface and the sealing surface and passing from the one end surface to the other end surface, a valve seat support having a support surface against which a sealing surface of the valve seat abuts to support a pressing force from the sealing surface, and a diaphragm provided to be in contact with and spaced apart from a seating surface of the valve seat supported by the valve seat support.

the diaphragm making a flow passage of the valve seat and a corresponding secondary flow path communicates through a gap between the diaphragm and a seating surface of the valve seat, the valve seat support having a sealing surface for blocking communication between the primary flow path and the secondary flow path in cooperation with a portion of an inner wall surface of the corresponding accommodation recess, and a detour passage for connecting the primary flow path and the flow passage of the valve seat.

More preferably, each of the primary flow paths may be open at a bottom surface of the valve body, each of the secondary flow paths may be branched into a plurality of branch flow paths within the valve body, and each of the plurality of branch flow paths may be open at any one of a top surface, a bottom surface, and a side surface of the valve body.

It is more preferable that the secondary flow paths and the communication flow path extend in the longitudinal direction of the valve body and are formed on a common axis. In addition, it is also possible to adopt a configuration in which the secondary flow path having one end connected to the first accommodation recess is closed in the valve body at the other end, and the secondary flow path having one end connected to the second accommodation recess is opened at the side surface of the valve body at the other end.

The flow rate control device of the present invention is a flow rate control device for controlling the flow rate of a fluid, the flow control device including the valve device described above.

The flow rate control method of the present invention is a flow rate control method comprising using a valve device having the above-described configuration for flow rate control of a process gas.

The fluid control device of the present invention is a fluid control device comprising a plurality of fluid devices that are arranged, the plurality of fluid devices including the valve device described above.

The semiconductor manufacturing method of the present invention comprises the above-mentioned valve device is used for controlling the flow rate of a process gas in a manufacturing process of a semiconductor device requiring a process step using the process gas in a sealed chamber.

The semiconductor manufacturing apparatus of the present invention comprises a fluid control device for supplying a process gas to a processing chamber, the fluid control device including a plurality of fluid devices, and the fluid devices including the valve device as described above.

Advantageous Effects of Invention

According to the present invention, the accommodation recess is provided in the valve body, the valve seat support is accommodated in the accommodation recess, the communication between the primary flow path and the secondary flow path is blocked, and on the other hand, the flow passage of the valve seat supported by the valve seat support and the primary flow path are connected by the bypass flow path of the valve seat support. Accordingly, the primary flow path and the secondary flow path need only be connected to the accommodation recess, and the degree of freedom of arrangement of the primary flow path and the secondary flow path can be drastically increased.

Further, according to the present invention, by making the first and second secondary flow paths communicate with each other through the communication flow path, the fluid flowing in from each primary flow path can flow through the first and second valve elements to both the secondary flow path connected to the first accommodation recess and the secondary flow path connected to the second accommodation recess, and the fluid from each primary flow path can be divided into a large number and the valve body can be downsized.

In addition, according to the present invention, the valve element for switching between the process gas and the purge gas is shared by the lines of the plurality of fluid control devices, so that the total number of the valve elements of the fluid control device can be reduced and the cost can be reduced.

Further, according to the present invention, whichever valve element among the first and second valve elements the fluid flows through, the gas flows through all of the secondary flow paths and the communication flow paths, thus minimizing the formation of the stagnation portion, and greatly improving the substitution property of the fluid.

BRIEF DESCRIPTION OF DRAWINGS

FIG. 1A is a front view including a longitudinal section of a portion of a valve device according to an embodiment of the present invention.

FIG. 1B is a top view of the valve device in FIG. 1A.

FIG. 1C, is a bottom view of the valve device in FIG. 1A.

FIG. 1D is a side view of a valve device in FIG. 1A.

FIG. 1E is a sectional view along line 1E-1E in FIG. 1A.

FIG. 2 is an enlarged sectional view of a main part of the valve device of FIG. 1A, showing a valve closed condition.

FIG. 3A is an enlarged sectional view of a main part of the valve device of FIG. 1A, showing one of two valve elements being opened and the other being closed.

FIG. 3B is an enlarged sectional view of a main part of the valve device of FIG. 1A, showing one of two valve elements being closed and the other being opened.

FIG. 4 is a sectional view of the inner disk.

FIG. 5 is sectional view of the valve seat.

FIG. 6 is sectional view of the valve seat support.

FIG. 7 is a perspective view showing an example of a fluid control device using a valve device according to an embodiment of the present invention.

FIG. 8 is a schematic configuration diagram of a semiconductor manufacturing apparatus according to an embodiment of the present invention.

DESCRIPTION OF EMBODIMENTS

Embodiments of the present invention will be described below with reference to the drawings. In the present specification and the drawings, the same reference numerals are used to denote components having substantially the same functions, and thus a repetitive description thereof is omitted, FIG. 1A to FIG. 1E show the construction of a valve device according to an embodiment of the present invention. FIG. 2 shows the main part of the valve device, and FIG. 3A and FIG. 3B show the operation of the valve device. FIG. 4 shows the cross-sectional structure of the inner disc, FIG. 5 shows the cross-sectional structure of the valve seat, and FIG. 6 shows the cross-sectional structure of the valve seat support.

In FIG. 1A to FIG. 3B, it is assumed that arrows A1 and A2 in the drawing indicate the vertical direction, A1 indicates the upward direction, and A2 indicates the downward direction. Arrows B1 and B2 indicate the longitudinal direction of the valve body 20 of the valve device 1, and B1 indicates one end side and B2 indicates the other end side. It is assumed that C1 and C2 indicate the width directions orthogonal to the longitudinal directions B1 and B2 of the valve body 20, and C1 indicates the front side and C2 indicates the back side.

The valve body 20 is a block-shaped member having a rectangular shape in a top view, and defines a top surface 20/1 and a bottom surface 20/2, and four side surfaces 20/3 to 20/6 extending between the top surface 20/1 and the bottom surface 20/2. In addition, it defines two accommodation recesses 22A, 22B that open at the top surface 20/1. The accommodation recesses 22A, 22B have a similar structure and are spaced apart in the longitudinal direction B1, B2. The accommodation recesses 22A and 22B each include a valve element 2A,2B, which will be described later.

As can be seen from FIG. 2 and the like, the accommodation recess 22 is composed of inner peripheral surfaces 22a, 22b, and 22c having different diameters and a bottom surface 22d. The diameter of the inner peripheral surfaces 22a, 22b, and 22c decreases in this order.

The valve body 20 defines primary flow paths 21A and 21B connected to the first and second accommodation recesses 22A and 22B, respectively, secondary flow paths 24A and 24B connected to the accommodation recesses 22A and 22B, respectively, and a communication flow path 24C connecting the accommodation recess 22A and the accommodation recess 22B. The communication flow path 24C functions as a part of the secondary flow path 24, as described later. The primary flow paths 21A and 21B are flow paths on the side where a fluid such as a gas is supplied from the outside. The secondary flow path 24 is a flow path for allowing a fluid such as a gas flowing in from the primary flow paths 21A and 21B through the valve element 2A,2B to flow out to the outside.

The primary flow path 21A is formed to be inclined with respect to the bottom surface 20/2 of the valve body 20, and has one end connected to the accommodation recess 22A at the bottom surface 22d and the other end opened at the bottom surface 20/2.

The primary flow path 21B is formed so as to be inclined in the opposite direction to the primary flow path 21A with respect to the bottom surface 20/2 of the valve body 20, and has one end connected to the accommodation recess 22B at the bottom surface 22d and the other end opened at the bottom surface 20'2.

Seal holding portions 21a and 21h are formed around the openings of the primary flow paths 21A and 21B, respectively. In the seal holding portions 21a and 21b, gaskets are disposed as seal members. The valve body 20 is connected to another flow path block (not shown) by screwing fastening bolts into the screw holes 20h1 and 20112. At this time, the gaskets held by the seal holding portions 21a and 21b are crushed by the fastening force of the fastening bolt between the gasket and another flow path block (not shown), so that the periphery of the opening of the primary flow paths 21A and 21B is sealed.

Examples of the gasket include gaskets made of metal or resin. Examples of the gasket include a soft gasket, a semi-metal gasket and a metal gasket, Specifically, the following is suitably used.
(1) Soft gasket
  Rubber O-ring
  Rubber seat (for full seating)
  Joint seat
  Expanded graphite sheet
  PTFE sheet
  PTFE jacketed type
(2) Semi-metal gasket
  Spiral-wound gasket
  Metal jacket gasket
(3) Metal gasket
  Solid-metal flat gasket
  Metal hollow O-ring
  Ring joint The same applies to the seal holding portions 25a1 and 26b1 provided around the openings of the branch flow paths 25 and 26, which will be described later, and a detailed description thereof will be omitted.

The secondary flow path 24 includes two secondary flow paths 24A and 24B formed on opposite sides to each other with respect to the accommodation recesses 22A and 22B in the longitudinal directions B1 and B2 of the valve body 20, and a communication flow path 24C connecting the accommodation recesses 22A and 22B.

The secondary flow paths 24A and 24B and the communication flow path 24C are formed on a common axis J1 extending in the longitudinal directions B1 and B2 of the valve body 20.

One end of the secondary flow path 24A is opened at the inner peripheral surface 22b of the accommodation recess 22A, and the other end 24a1 is closed inside the valve body 20.

One end of the secondary flow path 24B is opened on the inner peripheral surface 22b of the accommodation recess 22B, and the other end 24b1 is opened on the side surface 20/6.

The opening of the side surface 20/6 of the secondary flow path 24B is provided with a blocking member 30 by means of welding or the like, and the opening of the secondary flow path 24B is blocked.

One end of the communication channel 24C is opened at the inner peripheral surface 22b of the accommodation recess 22A, and the other end is opened at the inner peripheral surface 22h of the accommodation recess 22B. The secondary flow path 24A and the secondary flow path 24B communicate with each other via the communication flow path 24C.

The secondary flow paths 24A and 24B and the communication flow path 24C constituting the secondary flow path 24 can be easily formed by using a tool such as a drill. The secondary flow path 24 may be formed by a cutting process from the other end of the valve body 20 using a drill or the like, or may be formed by a cutting process from both the one end and the other cud using a drill or the like to communicate with each other in the valve body 20.

The secondary flow path 24A branches into two branch flow paths 25 at the other end 24a1, and opens at the top surface 20/1.

The secondary flow path 24B branches into two branch flow paths 26 in the middle, and opens at the top surface 20/1.

That is, in the valve device 1 according to the present embodiment, a fluid such as a gas flowing into the primary flow paths 21A and 21B, respectively, can be divided into four by the branch flow paths 25 and 26 of the secondary flow path 24.

The valve elements 2A,2B each has a diaphragm 14, an inner disc 15, a valve seat 16 and a valve seat support 50.

A valve seat support 50 having an outer diameter that fits with the inner peripheral surface 22c is inserted into each of the accommodation recesses 22A and 22B. As shown in FIG. 6, the valve seat support 50 is a columnar metal member, and has a detour passage 50a formed of a through hole at the center portion, and an annular support surface 50f1 centered on the detour passage 50a formed at the upper end surface. The support surface 50f1 of the valve seat support 50 is formed of a flat surface, and a step is formed on an outer peripheral portion of the support surface 50f1. The outer peripheral surface 50b1 of the valve sheet support 50 has a diameter to fit into the inner peripheral surface 22c of the accommodation recess 22, there is a step between the outer peripheral surface 50b2 which is reduced in diameter of the lower end side. An annular end surface 50b3 is formed by the step. As shown in FIG. 2 and the like, a sealing member 51 made of a plastic such as PTFE is fitted into the outer peripheral surface 50b2. The sealing member 51 is formed to have a rectangular cross-sectional shape and has a dimension to be crushed between the bottom surface 22d of the accommodation recess 22 and the end surface 50b3 of the valve seat support 50. When the sealing member 51 is crushed between the bottom surface 22d of the accommodation recess 22 and the end surface 50b3 of the valve seat support 50, resin enters between the outer peripheral surface 50b1 of the valve seat support 50 and the inner peripheral surface 22c and the bottom surface 22d of the accommodation recess 22, and the space between the valve seat support 50 and the accommodation recess 22 is reliably sealed. That is, the outer peripheral surface 50b2 and the end surface 50b3 serving as sealing surfaces cooperate with the inner peripheral surface 22c and the bottom surface 22d of the accommodation recess 22 to block the communication between the primary flow path 21A and the secondary flow path 24A and the communication between the primary flow path 21B and the secondary flow path 24B.

The detour passage 50a of the valve seat support 50 is connected to the primary flow path 21 that opens at the bottom surface 22d of the accommodation recess 22.

A valve seat 16 is provided on a support surface 501'1 of the valve seat support 50.

The valve seat 16 is formed of a resin such as PFA or PTFE so as to be elastically deformable, and, as shown in FIG. 5, the valve seat 16 is formed in an annular shape using, and has an annular seating surface 16s formed on one end surface and an annular sealing surface 16f formed on the other end surface of the valve seat 16. Inside the seating surface 16s and the sealing surface 16f, a flow passage 16a formed of a through hole is formed. The valve seat 16 has a small diameter portion 16b1 and a large diameter portion 16b2 on the outer peripheral side thereof, and a step portion is formed between the small diameter portion 16b1 and the large diameter portion 16b2.

The valve seat 16 is positioned with respect to the support surface 50f1 of the valve seat support 50 by the inner disk 15 as a positioning and pressing member, and is pressed toward the support surface 50f1 of the valve seat support 50. Specifically, a large diameter portion 15a1 and a small diameter portion 15a2 formed in the center portion of the inner disk 15 are formed, and a stepped surface 15a3 is formed between the large diameter portion 15a1 and the small diameter portion 15a2. An annular flat surface 15f1 is formed on one end surface side of the inner disk 15. An annular flat surface 15f2 is formed on the outer side on the other end surface side of the inner disk 15, and an annular flat surface 15f3 is formed on the inner side. The flat surface 15f2 and the flat surface 15f3 have different heights, and the flat surface 15f3 is positioned closer to the flat surface 15f1. An outer peripheral surface 15h that fits into the inner peripheral surface 22a of the accommodation recess is formed on the outer peripheral side of the inner disk 15. Further, a plurality of flow paths 15h passing from one end surface to the other end surface are formed at equal intervals in the circumferential direction. The large diameter portion 16b2 and the small diameter portion 16b1 of the valve seat 16 are fitted to the large diameter portion 15a1 and the small diameter portion 15a2 of the inner disk 15, whereby the valve seat 16 is positioned with respect to the support surface 50f1 of the valve seat support 50.

The flat surface 15f2 of the inner disk 15 is disposed on a flat step surface formed between the inner peripheral surface 22a and the inner peripheral surface 22h of the accommodation recess 22. A diaphragm 14 is disposed on a flat surface 15f1 of the inner disk 15, and a holding ring 13 is disposed on the diaphragm 14.

The actuator 10 is driven by a driving source such as a pneumatic pressure, and drives the diaphragm presser 12 movably held in the vertical directions A1 and A2. The tip end portion of the casing 11 of the actuator 10, as shown in FIG. 1A, is screwed into and fixed to the valve body 20. The tip end portion presses the holding ring 13 n downward direction A2, and the diaphragm 14 is fixed in the accommodation recess 22. The diaphragm 14 seals the accommodation recess 22 on the opening side. In addition, the inner disk 15 is also pressed in downward direction A2. The height of the step surface 15a3 is set so that the step surface 15a3 presses the valve seat 16 toward the support surface 50f1 of the valve seat support 50 in a state in which the flat surface 15f2 of the inner disk 15 is pressed against the step surface of the accommodation recess 22. The flat surface 15f3 of the inner disk 15 does not abut against the upper end surface of the valve seat support 50.

The diaphragm 14 has a diameter larger than the diameter of the valve seat 16, and is formed of a metal such as a stainless steel or a NiCo based alloy, or a fluorinated resin in a spherical shell shape so as to be elastically deformable. The diaphragm 14 is supported by the valve body 20 so as to be able to abut against and separate from the seating surface 16s of the valve seat 16.

In FIG. 2, the diaphragm 14 is pressed and elastically deformed by the diaphragm presser 12, and pressed against the seating surface 16s of the valve seat 16. The valve elements 2A,2B are both closed.

When the diaphragm 14 of the valve element 2A is released from the pressure by the diaphragm presser 12, the valve element is restored to a spherical shell shape as shown in FIG. 3A. In a state in which the diaphragm 14 is pressed against the seating surface 16s of the valve seat 16, the flow path between the primary flow path 21A and the secondary flow path 24 is in a closed state. When the diaphragm presser 12 of the valve element 2A is moved upward A1, the diaphragm 14 moves away from the seating surface 16s of the valve seat 16, as shown in FIG. 3A. The fluid G1 such as the process gas supplied from the primary flow path 21A flows through the gap between the diaphragm 14 on the valve element 2A side and the seating surface 16s of the valve seat 16, into the secondary flow path 24A, and also flows into the secondary flow path 24B through the communication flow path 24C. The fluid G1 eventually flows out of the valve body 20 through the branch flow paths 25 and 26. That is, the fluid G1 is divided into four flows.

Next, the diaphragm 14 of the valve element 2A is pressed again by the diaphragm presser 12, and the diaphragm 14 of the valve element 2B is released from the pressing by the diaphragm presser 12. As shown in FIG. 3B, the flow of the fluid G1 is blocked, and the fluid G2 such as a purge gas supplied from the primary flow path 21B flows through the gap between the diaphragm 14 on the valve element 2B side and the seat surface 16s of the valve seat 16, into the secondary flow path 24B, and also flows into the secondary flow path 24A through the communication flow path 24C. The fluid G2 eventually flows out of the valve body 20 through the branch flow paths 25 and 26. That is, the fluid G2 is divided into four flows.

As described above, according to the present embodiment, different fluids G1 and G2 supplied from the primary-flow paths 21A and 21B can be made to flow through the common secondary-flow path 24 composed of the secondary-flow paths 24A and 24B and the communication flow path 24C, and can be divided into four flows. That is, according to the present embodiment, in the miniaturized valve body 20, the two types of fluids G1 and G2 can be divided into four flows.

Note that, according to the present embodiment, the case where the flow is divided into four flows is exemplified, but if the number of branches from the secondary flow paths 24A and 24B is increased, for example, the flow can be easily divided into a larger number of flows. Preferably, the number of branches is the same as the number of lines of the carrier gas to be delivered to the processing chamber 800, which will be described later.

In addition, whichever fluid among the fluids G1 and G2 is made to circulate, since it flows through all of the secondary flow paths 24A and 24B and the communication flow path 24C, there is no flow path which generates a liquid pool, and the gas substitution property is extremely excellent.

In particular, since the valve body 20 is integrally formed, the volume of the communication flow path 24C can be reduced, and the difference in response at the time of gas switching for each of the branched destinations can be minimized.

In the above embodiment, the case where the secondary flow path 24 is branched into a plurality in the valve body 20, the branch flow path 25 and 26 open at the top surface 20f1 of the valve body 20 has been exemplified, but the present invention is not limited thereto, and a configuration in which they open at the bottom surface 20f2 or any of the side surfaces 20f3 to 20f6 can also be adopted.

In the above embodiment, the inner disk 15 and the valve seat 16 are separate members, but it is also possible to integrate the inner disk 15 and the valve seat 16.

Although the above embodiment exemplifies the case where the two types of fluids G1 and G2 are divided into four flows, but the present invention is not limited to this, and if the primary flow path and the valve element are added to the common valve body 20, the types of fluids to be flowed into the valve device 1 can be further increased.

In the above embodiment, since the fluid may stagnate in the region between the branch flow path 26 and the blocking member 30 of the secondary flow path 24B without being substituted. However, by embedding a round rod-shaped metal in this portion, is possible to further reduce the stagnation of the fluid.

Referring to FIG. 7, an exemplary fluid control device to which the valve device 1 according to the above embodiment is applied will be described.

The fluid control device shown in FIG. 7 is provided with a base plate BS made of metal, which is arranged along the width directions W1 and W2 and extends in the longitudinal directions G1 and G2. Note that W1 represents the front side, W2 represents the back side, G1 represents the upstream side, and G2 represents the downstream side. Various fluid devices 991A to 991E are installed on the base plate BS via a plurality of flow path blocks 992, and a flow path (not shown) through which a fluid flows from the upstream side G1 toward the downstream side G2 is formed by the plurality of flow path blocks 992.

Here, a "fluid device" is a device used in a fluid control device for controlling a flow of a fluid, and includes a body defining a fluid flow path, and has at least two flow path ports opening at a surface of the body. Specific examples include, but are not limited to, an open-close valve (two-way valve) 991A, a regulator 991B, a pressure gauge 991C, an open-close valve (three-way valve) 991D, a mass flow controller 991E which is a flow rate control device, and the like. The introducing pipe 993 is connected to a flow passage port on the upstream side of the flow passage (not shown) described above.

The valve device 1 according to the present embodiment is applicable to the mass flow controller 991E described above, and the flow rate of the fluid is controlled by the mass flow controller 991E. The valve device 1 according to the present embodiment can be applied to valves such as an open-close valve (two-way valve) 991A, a regulator 991B, a pressure gauge 991C, and an open-close valve (three-way valve) 991D.

Next, FIG. 8 shows an example of a semiconductor manufacturing apparatus to which the above-described fluid control device is applied.

Semiconductor manufacturing apparatus 1000 is a system for performing a semiconductor manufacturing process using atomic layer deposition (ALD: Atomic Layer Deposition method), where 600 is a process gas supply source. 700 is a gas box. 710 is a tank, 800 is a processing chamber, and 900 is an exhaust pump. The fluid control device shown in FIG. 7 is housed in a gas box 700.

In a treatment process that deposits a film on a substrate, in order to stably supply a process gas, a process gas supplied from a gas box 700 is temporarily stored in a tank 710 as a buffer, and a valve 720 provided in the immediate vicinity of the processing chamber 800 is opened and closed at high frequency to supply the process gas from the tank to the processing chamber of a vacuum atmosphere.

The ALD method is one of chemical vapor deposition methods, in which two or more types of process gases are alternately flowed on the substrate surface under film forming conditions such as temperature and time to react with atoms on the substrate surface to deposit a film layer by layer. This method allows control per atom layer, making it possible to form a uniform film thickness and grow the film very finely, even in term of film quality.

In the semiconductor manufacturing process by the ALD method, it is necessary to precisely adjust the flow rate of the process gas, and it is also necessary to secure the flow rate of the process gas to some extent by increasing the diameter of the substrate or the like.

A gas box 700 containing a fluid control device provides an accurately metered amount of process gas to the processing chamber 800. The tank 710 functions as a buffer for temporarily storing the process gas supplied from the gas box 700.

The processing chamber 800 provides a sealed processing space for forming a film on a substrate by an ALD method.

The exhaust pump 900 draws a vacuum inside the processing chamber 800.

The present invention is not limited to the above-described embodiments. Various additions, modifications, and the like can be made by those skilled in the art within the scope of the present invention. For example, in the application example described above, the valve device 1 is used in a semiconductor manufacturing process by the ALD method, but the present invention is not limited to this, and the present invention can be applied to any object requiring precise flow rate control, such as an atomic layer etching (ALE: Atomic Layer Etching) method.

REFERENCE SIGNS LIST

1: Valve device
2A,2B: Valve element
10: Actuator
11: Casing
12: Diaphragm presser
13: Holding ring
14: Diaphragm
15: inner disk
15$h$: Flow path
16: Valve seat
16$a$: Flow passage
16$f$: Sealing surface
16$s$: Seating surface
20: Valve body
20$f1$: Top surface
20$f2$: Bottom surface
20$f3$-20$f6$: Side surface
20$h1$ and 20$h2$: Screw hole
21A, 21B, 21: Primary flow path
21$a$, 21$b$: seal holding portion
22A, 22B, 22: Accommodation recess
24A, 24B, 24: Secondary flow path
24C: Communication flow path (secondary flow path)
25,26: Branch flow path
30: Blocking member
50: Valve seat support
50$a$: Detour passage
50$b2$, 50$b3$: Sealing surface
50$f1$: support surface
51: Sealing member
600: Process gas supply source
700: Gas box
710: Tank
720: Valve
800: Processing chamber
900: Exhaust pump
1000: Semiconductor manufacturing equipment
A1: upward
A2: downward
J1: Axis

The invention claimed is:

1. A valve device, comprising:
a block-shaped valve body,
the valve body defining first and second accommodation recesses in which first and second valve elements are respectively housed, primary flow paths respectively making the first and second accommodation recesses communicate with the exterior of the valve body, secondary flow paths respectively making the first and second accommodation recesses communicate with the exterior of the valve body, each secondary flow path extending to an outer periphery of a corresponding one of the first or second accommodation recess, and a communication flow path extending between an outer periphery of the first valve element and an outer periphery of the second valve element and connecting the first and second accommodation recesses to make the secondary flow paths communicate with each other, and
each of the first and second valve elements selectively switching a state of communication between the primary and secondary flow paths connected to the first or second accommodation recess.

2. The valve device according to claim 1, wherein the valve body defines opposing top and bottom surfaces and side surfaces extending between the top and bottom surfaces,
each of the first and second valve elements comprises:
a valve seat having an annular seating surface formed on one end surface, an annular sealing surface formed on the other end surface, and a flow passage formed inside between the annular seating surface and the annular sealing surface and passing from the one end surface to the other end surface,
a valve seat support having a support surface against which the annular sealing surface of the valve seat abuts to support the valve seat and receive a pressing force from the annular sealing surface, and
a diaphragm provided to be in contact with and spaced apart from the annular seating surface of the valve seat,
the diaphragm making the flow passage of the valve seat and a corresponding secondary flow path communicate through a gap between the diaphragm and the annular seating surface of the valve seat,
the valve seat support has a sealing surface that cooperates with a portion of the inner wall surface of the corresponding accommodation recess to block the communication between the corresponding primary and secondary flow paths, and a detour passage that connects the primary flow path and the flow passage of the valve seat.

3. The valve device according to claim 2, wherein each of the primary flow paths is open at the bottom surface of the valve body,
each of the secondary flow paths is branched into a plurality of branch flow paths in the valve body, and
each of the plurality of branch flow paths is open at any of a top surface, a bottom surface, and a side surface of the valve body.

4. The valve device according to claim 2, wherein the secondary flow paths and the communication flow path extend in the longitudinal direction of the valve body and are formed on a common axis.

5. The valve device according to claim 4, wherein the secondary flow path having one end connected to the first accommodation recess is closed at the other end in the valve body, and
the secondary flow path having one end connected to the second accommodation recess is open at the other end on the side surface of the valve body.

6. The valve device according to claim 2, further comprising a sealing member provided between a part of an inner wall surface of each of the first and second accommodation recesses and a sealing surface of the valve seat support.

7. The valve device according to claim 6, wherein the sealing member is configured to be crushed between a part of an inner wall surface of the accommodation recess and the valve seat support by receiving a pressing force from the valve seat.

8. The valve device according to claim 2, further comprising a positioning and pressing member for positioning the valve seat with respect to the support surface of the valve seat support and pressing the valve seat toward the support surface of the valve seat support, wherein the positioning and pressing member has a flow passage for making the flow passage of the valve seat and the secondary flow path communicate through a gap between the diaphragm and the annular seating surface.

9. The valve device according to claim 8, wherein the positioning and pressing member is disposed between the valve body and the diaphragm.

10. The valve device according to claim 8, further comprising an actuator for driving the diaphragm, wherein
a casing containing the actuator is screwed into the valve body, and
the positioning and pressing member presses the valve seat toward the support surface of the valve seat support by utilizing the screwing force of the casing.

11. A flow rate control device for controlling a flow rate of a fluid,
comprising the valve device as claimed in claim 1.

12. A flow rate control method comprising using the valve device as claimed in claim 1 for controlling the flow rate of a fluid.

* * * * *